(12) United States Patent
Carpenter et al.

(10) Patent No.: US 12,528,262 B2
(45) Date of Patent: Jan. 20, 2026

(54) SYSTEM FOR MARKING A COATED OPHTHALMIC LENS

(71) Applicant: Transitions Optical, Ltd., Tuam (IE)

(72) Inventors: William D. Carpenter, Galway (IE); Forrest R. Blackburn, Monroeville, PA (US)

(73) Assignee: Transitions Optical, Ltd., Tuam (IE)

( * ) Notice: Subject to any disclaimer, the term of this patent is extended or adjusted under 35 U.S.C. 154(b) by 452 days.

(21) Appl. No.: 18/013,325

(22) PCT Filed: Jun. 29, 2020

(86) PCT No.: PCT/EP2020/068206
§ 371 (c)(1),
(2) Date: Dec. 28, 2022

(87) PCT Pub. No.: WO2022/002344
PCT Pub. Date: Jan. 6, 2022

(65) Prior Publication Data
US 2023/0241849 A1     Aug. 3, 2023

(51) Int. Cl.
*B29D 11/00* (2006.01)
*B24B 13/005* (2006.01)
(Continued)

(52) U.S. Cl.
CPC .... *B29D 11/00432* (2013.01); *B24B 13/0055* (2013.01); *B29D 11/00865* (2013.01);
(Continued)

(58) Field of Classification Search
None
See application file for complete search history.

(56) References Cited

U.S. PATENT DOCUMENTS

| 6,188,040 B1 | 2/2001 | Darmes et al. |
| 7,267,436 B2 | 9/2007 | Ito et al. |
| (Continued) | | |

FOREIGN PATENT DOCUMENTS

| CN | 102974942 A | 3/2013 |
| CN | 104520671 A | 4/2015 |
| (Continued) | | |

OTHER PUBLICATIONS

Perucho et al., "A Novel Marking Reader for Progressive Addition Lenses Based on Gabor Holography", Optometry and Vision Science, May 2016, pp. 534-542, vol. 93:5.

*Primary Examiner* — Binh X Tran
(74) *Attorney, Agent, or Firm* — The Webb Law Firm

(57) ABSTRACT

A system for marking a coated optical article (10) having at least one first mark (18) on a surface of a substrate (20) of the coated optical article (10) includes at least one mark (18) identification device having at least one electromagnetic radiation source (111) configured to irradiate at least a portion of the surface of the substrate (20) having the at least one first mark (18) with electromagnetic radiation (119A, 123). The at least one mark (18) identification device further includes at least one imaging device configured to receive a portion of the electromagnetic radiation (119A, 123) reflected from the surface of the substrate (20) having the least one first mark (18) and determine a position of the at least one first mark (18) on the surface of the substrate (20). The system further includes at least one marking device configured for marking the coated optical article (10) with at least one second mark (180) based on the position of the at least one first mark (18).

20 Claims, 5 Drawing Sheets

(51) Int. Cl.
*B41J 2/455* (2006.01)
*B41M 5/26* (2006.01)
*B41M 5/28* (2006.01)
*C03C 15/00* (2006.01)
*G02C 7/02* (2006.01)

(52) U.S. Cl.
CPC .............. *B41J 2/455* (2013.01); *B41M 5/262* (2013.01); *B41M 5/28* (2013.01); *C03C 15/00* (2013.01); *G02C 7/021* (2013.01)

(56) References Cited

U.S. PATENT DOCUMENTS

| | | | |
|---|---|---|---|
| 8,115,792 B2 | 2/2012 | Petsch et al. | |
| 9,475,149 B1 | 10/2016 | Testrake | |
| 9,726,572 B2 | 8/2017 | Henry et al. | |
| 2005/0046792 A1* | 3/2005 | Ito | B29D 11/00009 351/159.75 |
| 2007/0146687 A1* | 6/2007 | Divo | G01M 11/0228 356/124 |
| 2007/0262061 A1 | 11/2007 | Agmon et al. | |
| 2008/0152859 A1 | 6/2008 | Nagai | |
| 2009/0302122 A1 | 12/2009 | Begon | |
| 2010/0141729 A1* | 6/2010 | Petsch | B41M 5/267 347/225 |
| 2014/0055743 A1 | 2/2014 | Okubo et al. | |
| 2014/0199521 A1 | 7/2014 | Carpenter | |
| 2014/0300856 A1 | 10/2014 | Dangelmaier et al. | |
| 2015/0036101 A1 | 2/2015 | Hoshino et al. | |
| 2016/0167173 A1 | 6/2016 | Dubois et al. | |
| 2016/0207249 A1 | 7/2016 | Maurice et al. | |
| 2016/0311054 A1 | 10/2016 | Testrake | |
| 2016/0325393 A1 | 11/2016 | Daimaru et al. | |
| 2017/0148759 A1* | 5/2017 | Hayata | H01L 24/83 |
| 2017/0261765 A1 | 9/2017 | Dangelmaier et al. | |
| 2019/0143454 A1 | 5/2019 | Choi et al. | |
| 2019/0308434 A1 | 10/2019 | Maurice et al. | |

FOREIGN PATENT DOCUMENTS

| | | |
|---|---|---|
| DE | 102010010337 A1 | 9/2011 |
| DE | 202017004865 U1 | 11/2017 |
| EP | 1645904 A1 | 4/2006 |
| EP | 2110071 A1 | 10/2009 |
| EP | 2184127 A1 | 5/2010 |
| JP | 2810151 B2 | 10/1998 |
| JP | 3081395 B2 | 8/2000 |
| JP | 2006150364 A | 6/2006 |
| JP | 200741569 A | 2/2007 |
| WO | 2015015023 A1 | 2/2015 |

* cited by examiner

SYSTEM FOR MARKING A COATED OPHTHALMIC LENS

BACKGROUND OF THE DISCLOSURE

Field of the Disclosure

The present disclosure generally relates to a system and method for marking a coated optical article having at least one first mark on a surface of a substrate of the coated optical article that involves identifying a position of the at least one first mark and marking the coated optical article with at least one second mark having a position based on the position of the at least one first mark.

Description of the Related Art

With optical articles, such as ophthalmic lenses, one or more marks are often associated with at least one surface of a substrate of the optical article. Such marks can be used for various purposes, such as, for example, identifying the manufacturer of the optical article, identifying a particular production run that resulted in formation of the optical article, and/or providing information about the optical article, such as optical characteristics (e.g., optical axes, centering points, etc.) that can be used by an optician to properly and accurately fit the optical article into a lens frame. Such marks are typically unobservable when the optical article is in normal use, such as being unobservable by a person wearing a pair of ophthalmic lenses having such a mark. The marks can be rendered observable under certain limited circumstances, such as exposure to a particular wavelength of light, so as to determine the information contained in the mark. Typically, the marks are of relatively small dimensions (1.0 mm to 2.0 mm). It is often desirable that the mark be a permanent mark, so the information provided thereby can be accessed more than once and/or at a time that is remote from formation of the mark. In some examples, the mark is introduced to the substrate by physically engraving the surface of the substrate (such as using a stylus or a laser), chemically etching the surface of the substrate, or molding the mark during the manufacture of the substrate.

Present methods of introducing a mark into an optical article can result in the formation of a mark that is not readily observable, under some conditions, when the substrate is coated with one or more coatings. It would be desirable to develop new systems and methods for marking a coated optical article having at least one first mark on a surface of a substrate of the coated optical article with at least one second mark to increase the visibility of the at least one first mark.

SUMMARY OF THE DISCLOSURE

In accordance with some embodiments or aspects of the present disclosure, a system may be provided for marking a coated optical article having at least one first mark on a surface of a substrate of the coated optical article. The system may include at least one mark identification device having at least one electromagnetic radiation source configured to irradiate at least a portion of the surface of the substrate having the at least one first mark with electromagnetic radiation. The system further may include at least one imaging device configured to receive a portion of the electromagnetic radiation reflected from the surface of the substrate having the at least one first mark and determine a position of the at least one first mark on the surface of the substrate. The system may further include at least one marking device configured for marking the coated optical article with at least one second mark having a position based on the position of the at least one first mark.

In accordance with some embodiments or aspects of the present disclosure, the at least one electromagnetic radiation source may be a laser having a wavelength in a range of 190 nm to 10,000 nm. The at least one imaging device may have a viewing surface configured for receiving the portion of the electromagnetic radiation reflected from the surface of the substrate and a camera configured for imaging the viewing surface.

In accordance with some embodiments or aspects of the present disclosure, the at least one mark identification device further may include at least one beam manipulation device configured for controlling at least one characteristic of the electromagnetic radiation. The at least one beam manipulation device may include at least one of a beam expander, a collimating lens, a converging lens, a diverging lens, a spatial filter, a galvanometer, a servo, and a gimbal.

In accordance with some embodiments or aspects of the present disclosure, the at least one mark identification device further may include at least one source manipulation device configured for controlling a position of the at least one electromagnetic radiation source relative to the coated optical article.

In accordance with some embodiments or aspects of the present disclosure, the at least one marking device may be configured to mark at least one coating layer of the coated optical article with the at least one second mark. The at least one second mark may be an array of elements on at least one coating layer of the coated optical article. The at least one marking device may be configured to adjust at least one of a size of each element in the array of elements, a depth of each element in the array of elements, and a density of the array of elements.

In accordance with some embodiments or aspects of the present disclosure, the at least one marking device may include an etching device and at least one mirror configured for reflecting a beam from the etching device onto the coated optical article. The etching device may be a laser having a wavelength in a range of 190 nm to 30,000 nm.

In accordance with some embodiments or aspects of the present disclosure, the at least one imaging device may include a camera and a mask having at least one opening, the mask being positioned between the camera and the coated optical article.

In accordance with some embodiments or aspects of the present disclosure, the system may further include a verification device configured for comparing the position of the at least one second mark relative to the position of the at least one first mark and determining whether the position of the at least one second mark is within a predetermined distance of the position of the at least one first mark. The verification device may include a verification camera and a backlight source. The coated optical article may be configured to be positioned between the verification camera and the backlight source. The verification device may be further configured for guiding the at least one marking device such that the position of the at least one second mark at least partially overlaps the position of the at least one first mark.

In accordance with some embodiments or aspects of the present disclosure, a method may be provided for marking a coated optical article having at least one first mark on a surface of a substrate of the coated optical article. The method may include irradiating at least a portion of the surface of the substrate having the at least one first mark with electromagnetic radiation using at least one electromagnetic radiation source, and determining a position of the at least one first mark on the surface of the substrate by receiving with at least one mark identification device a portion of the electromagnetic radiation reflected from the surface of the substrate having the at least one first mark. The method may further include marking the coated optical article with at least one second mark having a position based on the position of the at least one first mark using at least one marking device.

In accordance with some embodiments or aspects of the present disclosure, the at least one electromagnetic radiation source may be a laser having a wavelength in a range of 190 nm to 10,000 nm. The portion of the electromagnetic radiation reflected from the surface of the substrate may be received on a viewing surface of the at least one imaging device of the at least one mark identification device and wherein the viewing surface is imaged using a camera.

In accordance with some embodiments or aspects of the present disclosure, the method may further include controlling at least one characteristic of the electromagnetic radiation using at least one beam manipulation device of the at least one mark identification device. The at least one beam manipulation device may include at least one of a beam expander, a collimating lens, a converging lens, a diverging lens, a spatial filter, a galvanometer, a servo, and a gimbal.

In accordance with some embodiments or aspects of the present disclosure, the method may further include controlling a position of the at least one electromagnetic radiation source relative to the coated optical article using at least one source manipulation device of the at least one mark identification device.

In accordance with some embodiments or aspects of the present disclosure, marking the coated optical article may include etching the at least one second mark into at least one coating layer of the coated optical article using an etching device. The etching device may be a laser having a wavelength in a range of 190 nm to 30,000 nm.

In accordance with some embodiments or aspects of the present disclosure, the at least one imaging device may include a camera and a mask having at least one opening, with the mask being positioned between the camera and the coated optical article. The at least one marking device may be configured to mark at least one coating layer of the coated optical article with the at least one second mark.

In accordance with some embodiments or aspects of the present disclosure, marking the coated optical article with at least one second mark may include marking an array of elements on at least one coating layer of the coated optical article. The method may further include adjusting at least one of a size of each element in the array of elements, a depth of each element in the array of elements, and a density of the array of elements.

In accordance with some embodiments or aspects of the present disclosure, the method may further include comparing the position of the at least one second mark relative to the position of the at least one first mark using a verification device and determining whether the position of the at least one second mark is within a predetermined distance of the position of the at least one first mark. The verification device may include a verification camera and a backlight source. The coated optical article may be configured to be positioned between the verification camera and the backlight source. The verification device may be further configured for guiding the at least one marking device such that the position of the at least one second mark at least partially overlaps the position of the at least one first mark.

In accordance with some embodiments or aspects of the present disclosure, provided is a coated optical article having at least one first mark on a surface of a substrate of the coated optical article and at least one second mark on at least one coating layer of the coated optical article, wherein the optical article may be obtainable by any method described herein.

A system and method of making an optical article may be characterized by one or more of the following aspects:

In a first aspect, the present invention may relate to a system for marking a coated optical article having at least one first mark on a surface of a substrate of the coated optical article, the system comprising: at least one mark identification device comprising: at least one electromagnetic radiation source configured to irradiate at least a portion of the surface of the substrate having the at least one first mark with electromagnetic radiation; and at least one imaging device configured to receive a portion of the electromagnetic radiation reflected from the surface of the substrate having the at least one first mark and determine a position of the at least one first mark on the surface of the substrate; and at least one marking device configured for marking the coated optical article with at least one second mark having a position based on the position of the at least one first mark.

In a second aspect, the at least one electromagnetic radiation source of the system in accordance with the first aspect is a laser having a wavelength in a range of 190 nm to 10,000 nm.

In a third aspect, the at least one imaging device in accordance with the first aspect or the second aspect comprises a viewing surface configured for receiving the portion of the electromagnetic radiation reflected from the surface of the substrate and a camera configured for imaging the viewing surface.

In a fourth aspect, the at least one mark identification device in accordance with any one of the first to third aspects further comprises at least one beam manipulation device configured for controlling at least one characteristic of the electromagnetic radiation.

In a fifth aspect, the at least one beam manipulation device in accordance with the fourth aspect comprises at least one of a beam expander, a collimating lens, a converging lens, a spatial filter, a diverging lens, a galvanometer, a servo, or a gimbal.

In a sixth aspect, the at least one mark identification device in accordance with any one of the preceding first to fifth aspects further comprises at least one source manipulation device configured for controlling a position of the at least one electromagnetic radiation source relative to the coated optical article.

In a seventh aspect, the at least one marking device in accordance with any one of the preceding first to sixth aspects is configured to mark at least one coating layer of the coated optical article with the at least one second mark.

In an eighth aspect, the at least one second mark in accordance with any one of the preceding first to seventh aspects is an array of elements on at least one coating layer of the coated optical article.

In a ninth aspect, the at least one marking device in accordance with the eighth aspect is configured to adjust at least one of a size of each element in the array of elements, a depth of each element in the array of elements, or a density of the array of elements.

In a tenth aspect, the at least one marking device in accordance with any one of the preceding first to ninth aspects comprises an etching device and at least one mirror configured for reflecting a beam from the etching device onto the coated optical article.

In an eleventh aspect, the etching device in accordance with the tenth aspect is a laser having a wavelength in a range of 190 nm to 30,000 nm.

In a twelfth aspect, the at least one imaging device in accordance with any one of the preceding first to eleventh aspects comprises a camera and a mask having at least one opening, the mask being positioned between the camera and the coated optical article.

In a thirteenth aspect, the system in accordance with any one of the preceding first to twelfth aspects further comprising a verification device configured for comparing the position of the at least one second mark relative to the position of the at least one first mark and determining whether the position of the at least one second mark is within a predetermined distance of the position of the at least one first mark.

In a fourteenth aspect, the verification device in accordance with the thirteenth aspect comprises a verification camera and a backlight source, and wherein the coated optical article is configured to be positioned between the verification camera and the backlight source.

In a fifteenth aspect, the verification device in accordance with the thirteenth or fourteenth aspect is further configured for guiding the at least one marking device such that the position of the at least one second mark at least partially overlaps the position of the at least one first mark.

In a sixteenth aspect, a method is provided for marking a coated optical article having at least one first mark on a surface of a substrate of the coated optical article, the method comprising: irradiating at least a portion of the surface of the substrate having the at least one first mark with electromagnetic radiation using at least one electromagnetic radiation source; determining a position of the at least one first mark on the surface of the substrate by receiving with at least one mark identification device a portion of the electromagnetic radiation reflected from the surface of the substrate having the at least one first mark; and marking the coated optical article with at least one second mark having a position based on the position of the at least one first mark using at least one marking device.

In a seventeenth aspect, the at least one electromagnetic radiation source in accordance with the sixteenth aspect is a laser having a wavelength in a range of 190 nm to 10,000 nm.

In an eighteenth aspect, the portion of the electromagnetic radiation in accordance with the sixteenth or seventeenth aspect reflected from the surface of the substrate is received on a viewing surface of the at least one imaging device of the at least one mark identification device and wherein the viewing surface is imaged using a camera.

In a nineteenth aspect, the method in accordance with any one of the sixteenth to eighteenth aspects further comprises controlling at least one characteristic of the electromagnetic radiation using at least one beam manipulation device of the at least one mark identification device.

In a twentieth aspect, the at least one beam manipulation device in accordance with the nineteenth aspect comprises at least one of a beam expander, a collimating lens, a converging lens, a diverging lens, a spatial filter, a galvanometer, a servo, or a gimbal.

In a twenty first aspect, the method in accordance with any one of the preceding sixteenth to twentieth aspects further comprises controlling a position of the at least one electromagnetic radiation source relative to the coated optical article using at least one source manipulation device of the at least one mark identification device.

In a twenty second aspect, marking the coated optical article in accordance with any of the preceding sixteenth to twenty first aspects comprises etching the at least one second mark into at least one coating layer of the coated optical article using an etching device.

In a twenty third aspect, the etching device in accordance with the twenty second aspect is a laser having a wavelength in a range of 190 nm to 30,000 nm.

In a twenty fourth aspect, the at least one imaging device in accordance with any one of the preceding sixteenth to twenty third aspects comprises a camera and a mask having at least one opening, the mask being positioned between the camera and the coated optical article.

In a twenty fifth aspect, the at least one marking device in accordance with any one of the preceding sixteenth to twenty fourth aspects is configured to mark at least one coating layer of the coated optical article with the at least one second mark.

In a twenty sixth aspect, marking the coated optical article with at least one second mark in accordance with any one of the preceding sixteenth to twenty fifth aspects comprises marking an array of elements on at least one coating layer of the coated optical article.

In a twenty seventh aspect, the method in accordance with any of the preceding sixteenth to twenty sixth aspects further comprises adjusting at least one of a size of each element in the array of elements, a depth of each element in the array of elements, or a density of the array of elements.

In a twenty eighth aspect, the method in accordance with any one of the preceding sixteenth to twenty seventh aspects further comprises comparing the position of the at least one second mark relative to the position of the at least one first mark using a verification device and determining whether the position of the at least one second mark is within a predetermined distance of the position of the at least one first mark.

In a twenty ninth aspect, the verification device in accordance with the twenty eighth aspect comprises a verification camera and a backlight source, and wherein the coated optical article is configured to be positioned between the verification camera and the backlight source.

In a thirtieth aspect, the verification device in accordance with the twenty eighth or twenty ninth aspects is further configured for guiding the at least one marking device such that the position of the at least one second mark at least partially overlaps the position of the at least one first mark.

In a thirty first aspect, a coated optical article having at least one first mark on a surface of a substrate of the coated optical article and at least one second mark on at least one coating layer of the coated optical article is obtained by the method of any one of the sixteenth to thirtieth aspects.

These and other features and characteristics of optical articles described herein, as well as the methods of manufacture of such articles, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only.

BRIEF DESCRIPTION OF THE DRAWINGS

In FIGS. 1-8 the same characters represent the same components unless otherwise indicated.

DETAILED DESCRIPTION

Figure 1:
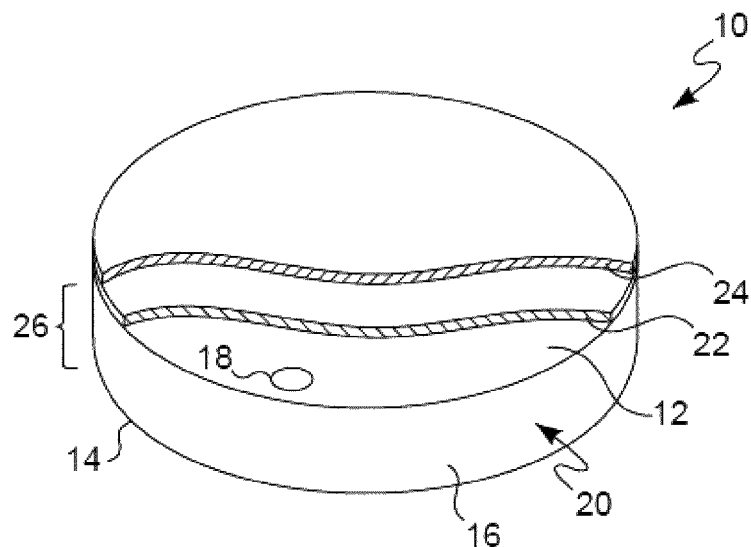
FIG. 1 is a representative partial cross-sectional perspective view of a coated optical article having a first mark and one or more coating layers in accordance with some embodiments or aspects of the present disclosure.

As used herein, the singular form of "a", "an", and "the" include plural referents unless the context clearly dictates otherwise.

Spatial or directional terms, such as "left", "right", "inner", "outer", "above", "below", and the like, relate to the invention as shown in the drawing figures and are not to be considered as limiting as the invention can assume various alternative orientations.

All numbers used in the specification and claims are to be understood as being modified in all instances by the term "about". By "about" is meant plus or minus twenty-five percent of the stated value, such as plus or minus ten percent of the stated value. However, this should not be considered as limiting to any analysis of the values under the doctrine of equivalents.

Unless otherwise indicated, all ranges or ratios disclosed herein are to be understood to encompass the beginning and ending values and any and all subranges or subratios subsumed therein. For example, a stated range or ratio of "1 to 10" should be considered to include any and all subranges or subratios between (and inclusive of) the minimum value of 1 and the maximum value of 10; that is, all subranges or subratios beginning with a minimum value of 1 or more and ending with a maximum value of 10 or less. The ranges and/or ratios disclosed herein represent the average values over the specified range and/or ratio.

The terms "first", "second", and the like are not intended to refer to any particular order or chronology, but refer to different conditions, properties, or elements.

All documents referred to herein are "incorporated by reference" in their entirety.

The term "at least" is synonymous with "greater than or equal to".

As used herein, "at least one of" is synonymous with "one or more of". For example, the phrase "at least one of A, B, or C" means any one of A, B, or C, or any combination of any two or more of A, B, or C. Further, "at least one of A, B, and C" includes A alone; or B alone; or C alone; or A and B; or A and C; or B and C; or all of A, B, and C.

The term "includes" is synonymous with "comprises".

As used herein, the terms "parallel" or "substantially parallel" mean a relative angle as between two objects (if extended to theoretical intersection), such as elongated objects and including reference lines, that is from 0° to 5°, or from 0° to 3°, or from 0° to 2°, or from 0° to 1°, or from 0° to 0.5°, or from 0° to 0.25°, or from 0° to 0.1°, inclusive of the recited values.

As used herein, the terms "perpendicular" or "substantially perpendicular" mean a relative angle as between two objects at their real or theoretical intersection is from 85° to 90°, or from 87° to 90°, or from 88° to 90°, or from 89° to 90°, or from 89.5° to 90°, or from 89.75° to 90°, or from 89.9° to 90°, inclusive of the recited values.

As used herein, the term "optical" means pertaining to or associated with light and/or vision. For example, according to various non-limiting aspects disclosed herein, the optical article, article or device can be chosen from ophthalmic elements, articles, and devices, display elements, articles, and devices, windows, and mirrors.

As used herein, the term "ophthalmic" means pertaining to or associated with the eye and vision. Non-limiting examples of ophthalmic articles or elements include corrective and non-corrective lenses, including single vision or multi-vision lenses, which may be either segmented or non-segmented multi-vision lenses (such as, but not limited to, bifocal lenses, trifocal lenses and progressive lenses), as well as other elements used to correct, protect, or enhance (cosmetically or otherwise) vision, including without limitation, contact lenses, intra-ocular lenses, magnifying lenses, and protective lenses or visors.

As used herein, the terms "lens" and "lenses" mean and encompass at least individual lenses, lens pairs, partially formed (or semi-finished) lenses, fully formed (or finished) lenses, and lens blanks.

As used herein, the term "ophthalmic substrate" means lenses, partially formed lenses, and lens blanks.

As used herein, the term "coating" means a supported film derived from a flowable composition, which may or may not have a uniform thickness, and specifically excludes polymeric sheets.

As used herein, the term "mark" means one or more marks.

As used herein, the terms "visible light" or "visible radiation" means electromagnetic radiation having a wavelength in the range of 380 nm to 780 nm.

As used herein, the terms "ultraviolet", "ultraviolet radiation", and "ultraviolet light" mean electromagnetic radiation having a wavelength in the range of 100 nm to less than 380 nm. The term "UV" means ultraviolet, such as ultraviolet radiation.

As used herein, the terms "infrared", "infrared radiation", and "infrared light" mean electromagnetic radiation having a wavelength in the range of more than 780 nm and up to 30,000 nm.

The discussion of various examples or aspects may describe certain features as being "particularly" or "preferably" within certain limitations (e.g., "preferably", "more preferably", or "even more preferably", within certain limitations). It is to be understood that the disclosure is not limited to these particular or preferred limitations but encompasses the entire scope of the various examples and aspects described herein.

The disclosure comprises, consists of, or consists essentially of the following examples or aspects, in any combination. Various examples or aspects of the disclosure are illustrated in separate drawing figures. However, it is to be understood that this is simply for ease of illustration and discussion. In the practice of the disclosure, one or more examples or aspects shown in one drawing figure can be combined with one or more examples or aspects shown in one or more of the other drawing figures.

In some embodiments or aspects, the present disclosure is generally directed to an optical article 10, and to a system and method for marking a coated optical article having at least one first mark on a surface of a substrate of the coated optical article. Prior to describing the system and method, an exemplary optical article 10 will now be described.

In various embodiments or aspects of the present disclosure, the optical article 10 can be selected from ophthalmic articles or elements, display articles or elements, windows, mirrors, active liquid crystal cell articles or elements, or passive liquid crystal cell articles or elements.

Examples of ophthalmic articles or elements include, but are not limited to, corrective and non-corrective lenses, including single vision or multi-vision lenses, which can be either segmented or non-segmented multi-vision lenses (such as, but not limited to, bifocal lenses, trifocal lenses, and progressive lenses), as well as other elements used to correct, protect, or enhance (cosmetically or otherwise) vision, including without limitation, contact lenses, intraocular lenses, magnifying lenses, and protective lenses or visors.

Examples of display articles, elements and devices include, but are not limited to, screens, monitors, and security elements, including without limitation, security marks and authentication marks.

Examples of windows include, but are not limited to, automotive and aircraft transparencies, filters, shutters, and optical switches.

With reference to FIG. 1, the optical article 10 generally includes a substrate 20 and one or more coating layers applied to one or more surfaces of the substrate 20. In some embodiments or aspects, the one or more coating layers may include a first coating layer 22 applied over at least a portion of at least one surface of the optical article 10. The optical article 10 further may include one or more additional coating layers 24 applied over at least a portion of the first coating layer 22.

With continued reference to FIG. 1, the substrate 20 has a forward or top surface 12, a rearward or bottom surface 14, and a side surface 16 extending between the top surface 12 and the bottom surface 14. When optical article 10 is an ophthalmic lens, the bottom surface 14 is opposed to the eye of an individual wearing optical article 10, the side surface 16 typically resides within a supportive frame, and the top surface 12 faces incident light (not shown) at least a portion of which passes through optical article 10 and into the individual's eye.

With some embodiments or aspects, at least one of the top surface 12, the bottom surface 14, and the side surface 16 may be convex, concave, or planar. Together, the top surface 12, the bottom surface 14, and the side surface 16 define an exterior 26 of the substrate 20 that generally defines an overall outer physical shape of the optical article 10. The first coating layer 22 and the one or more additional coating layers 24 may be applied to any portion of the exterior 26 of the substrate 20.

The substrate 20 may include an inorganic material, an organic polymeric material, or combinations thereof. The substrate 20 can, with some aspects, be an ophthalmic substrate. Non-limiting examples of organic materials suitable for use in forming ophthalmic substrates include, but are not limited to, the art-recognized polymers that are useful as ophthalmic substrates, such as organic optical resins that are used to prepare optically clear castings for optical applications, such as ophthalmic lenses. Non-limiting examples of inorganic materials suitable for use in forming the substrate 20 of the optical article 10 of the present disclosure include glasses, such as silica based glasses, minerals, ceramics, and metals. For example, in one non-limiting aspect the substrate 20 can include glass.

With continued reference to FIG. 1, at least one indicia, such as at least one first mark 18, may be provided on the substrate 20. In some embodiments or aspects, the first mark 18 may be provided on a surface of the substrate 20, such as the top surface 12. The first mark 18 may be formed on a concave surface, a convex surface, or a planar surface of the exterior 26 of the substrate 20. The first mark 18 may be formed as a topographical feature that may protrude from the exterior 26 of the substrate 20, or a topographical feature that is recessed into the exterior 26 of the substrate 20.

In some embodiments or aspects, the first mark 18 may be shaped to define an optical reference mark that a practitioner may use as a reference point in matching a power of the optical article 10 to a wearer's prescription. In other aspects, the first mark 18 may be an indicia, such as a logo. The first mark 18 may be formed as an array of a plurality of individual marks 18 that, taken together, define the overall mark. Where a plurality of marks 18 are provided on the exterior surface 26 of the substrate 20, the plurality of marks 18 may be provided in same plane or offset planes. Various dimensions of the first mark 18, including the depth, height, and width, can be selected in accordance with art-recognized methods.

In some embodiments or aspects, the first mark 18 may be provided on the substrate 20 in a number of ways. For example, one or more first marks 18 may be monolithically formed on the substrate 20, such as, for example, by molding. In other aspects, one or more marks 18 may be formed on the substrate 20 by etching, engraving, or according to other methods known by those skilled in the field to imprint the desired first mark 18 on the substrate 20. For example, a laser may be used to engrave the exterior 26 of the substrate 20 with the mark. In various embodiments or aspects, the first mark 18 is formed on the substrate 20 prior to coating the substrate with one or more coatings.

With continued reference to FIG. 1, the optical article 10 includes one or more coatings, such as a first coating layer 22 and one or more additional coating layers 24, applied over at least a portion of the exterior 26 of the substrate 20 and the first mark 18. Examples of the first coating layer 22 and/or the one or more additional coating layers 24 include, but are not limited to: primer coatings and films; protective coatings and films, including transitional coatings and films and abrasion resistant coatings and films; anti-reflective coatings and films; polarizing coatings and films; and combinations thereof.

The first coating layer 22 and/or the one or more additional coating layers 24 may be optically clear (without a color hue), or have a desired color hue. The first coating layer 22 and/or the one or more additional coating layers 24, with some additional aspects, can include a static dye, a photochromic material, or a combination of two or more thereof. In some embodiments or aspects, the first coating layer 22 and/or the one or more additional coating layers 24 are free of static dyes, and photochromic materials.

The first coating layer 22 and/or the one or more additional coating layers 24 may be formed over the entire exterior 26 of the substrate 20, or on at least a portion of at least one surface of the substrate 20, such as the top surface 12. The first coating layer 22 may be conformal to the exterior 26 and the first mark 18, or it may form a planar surface over the exterior 26 and the first mark 18. In various embodiments or aspects, the first coating layer 22 and/or the one or more additional coating layers 24 may be applied over at least a portion of the exterior 26 of the substrate 20 using a variety of coating methods, including, without limitation, spin, spray, dip, flow, curtain, PVD (physical vapor deposition), CVD (chemical vapor deposition), plasma enhanced CVD, evaporation, sputtering, electro-deposition, and printing, such as inkjet printing.

The first coating layer 22 and other optional films and/or layers (such as but not limited to the one or more additional coating layers 24) that are formed on or over the substrate 20 each have clarity at least sufficient so as to allow observance of a source of electromagnetic energy through the coated optical article 10 and a reflection of the electromagnetic energy incident on a surface of the coated optical article 10. With some aspects, the first coating layer 22 and one or more additional layers 24 each independently have a percent transmittance, such as percent transmittance of visible light, of greater than 0% and less than or equal to 100%, such as from 50% to 100%. In some embodiments or aspects, the first coating layer 22 and one or more additional coating layers 24 have reflectance at least sufficient so as to allow a reflection of at least a portion of electromagnetic energy incident on the exterior surface of the coated optical article 10.

In some embodiments or aspects, the first coating layer 22 and/or the one or more additional coating layers 24 have a similar refractive index value relative to the refractive index value of the substrate 20, depending on a thickness of the first coating layer 22 and/or the one or more additional coating layers 24. For example, the first coating layer 22 and/or the one or more additional coating layers 24 have a refractive index value that is within +/−0.04 or less of the refractive index value of the substrate 20. In other embodiments or aspects, the first coating layer 22 and/or the one or more additional coating layers 24 have a different refractive index value relative to the refractive index value of the substrate 20, depending on a thickness of the first coating layer 22 and/or the one or more additional coating layers 24. For example, the first coating layer 22 and/or the one or more additional coating layers 24 have a refractive index value that is at least +/−0.04 higher or lower than the refractive index value of the substrate 20. While not intending to be bound by any theory, it is believed that the similarity or difference in the refractive index values of the first coating layer 22 and/or the one or more additional coating layers 24 to the refractive index value of the substrate 20 make the first mark 18 difficult to observe to a human eye when inspecting the coated optical article 10. In other words, while the first mark 18 may be visible on an uncoated substrate 20, applying the first coating layer 22 and/or the one or more additional coating layers 24 onto the substrate 20 and over the first mark 18 may make it more difficult or impossible to visually observe the first mark 18.

In some embodiments or aspects, a system 100 is provided for marking the coated optical article 10 having the first mark 18 with a second mark based on a position of the first mark 18. The system 100 may be configured for identifying a position of the first mark 18, and marking the coated optical article 10 with a second mark. In this manner, the second mark may be visible when a source of electromagnetic energy is viewed through the coated optical article 10 relative to the second mark or when the source of electromagnetic energy is reflected from a surface of the coated optical article 10. In some embodiments or aspects, the system 100 may be further configured for comparing the position of the second mark relative to the first mark 18 and determining whether the position of the second mark is within a predetermined distance of the position of the first mark 18.

Figure 2:
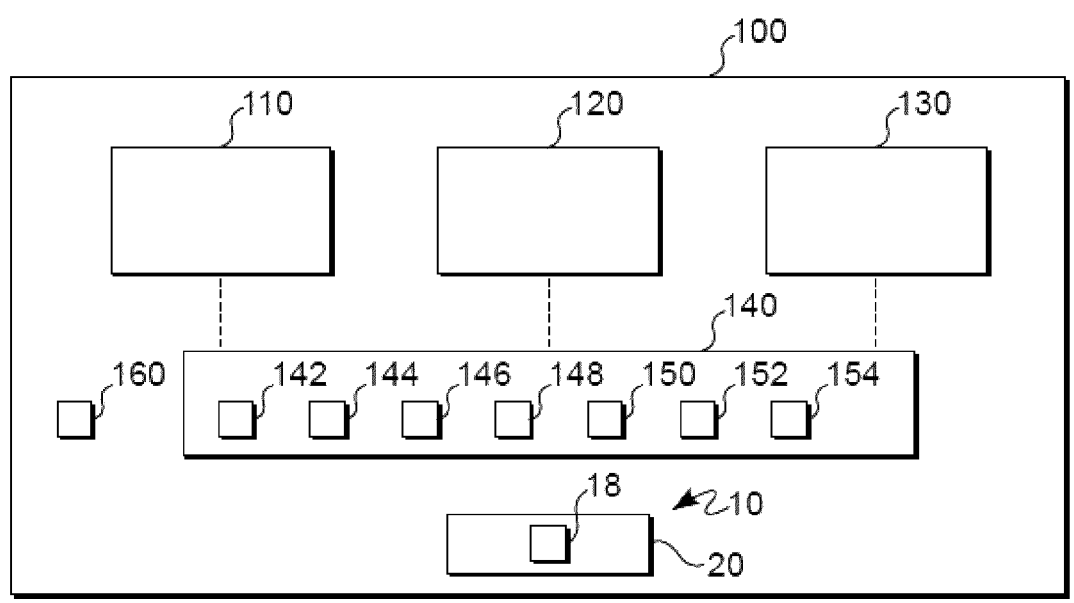
FIG. 2 is a schematic view of a system for marking the coated optical article of FIG. 1 in accordance with some embodiments or aspects of the present disclosure.

With reference to FIG. 2, the system 100 has a mark identification device 110 configured for identifying a position of the first mark 18 on the substrate 20 of the coated optical article 10. The system 100 further has a marking device 120 configured for marking the coated optical article 10 with a second mark 180. The system 100 further has a verification device 130 configured for comparing the position of the second mark 180 relative to the first mark 18 and determining whether the position of the second mark 180 is within a predetermined distance of the position of the first mark 18. In various embodiments or aspects, the system 100 may have one or more mark identification devices 110, one or more marking devices 120, one or more mark verification devices 130, and/or one or more controllers 140.

With some embodiments or aspects, increasing the visibility of the first mark 18 by marking the optical article 10 with a second mark may be helpful to a practitioner who must check and match the power of the lens according to a wearer's prescription. For example, symbols representing lens power and other identifying information useful to the practitioner may be marked on the optical article 10 in the form of the second mark even when the first mark 18 cannot be readily identified. A highly visible second mark of the present disclosure may be useful to the quality control personnel responsible for inspection of optical articles, or it may be used as an indicia in an automated verification system. When the optical article 10 having the second mark of the present disclosure is inspected in the presence of a source of electromagnetic energy, the second mark is easily identifiable against the surrounding surface of the optical article 10.

In some embodiments or aspects, the system 100 may include a controller 140 that is configured to control operation of one or more components of the system 100, such as the mark identification device 110, the marking device 120, and the verification device 130. The controller 140 may be configured to transmit and/or receive data to and/or from one or more components of the system 100 via a communication network 160 having a wired or wireless communication connection. In some embodiments or aspects, a wired communication connection may be one or more physical wires connecting one or more components of the system 100 to the controller 140. Examples of a wireless communication connection include, without limitation, a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, an NFC communication connection, an RFID communication connection, a Bluetooth® communication connection, and/or the like, and/or a combination of some or all of these or other types of networks.

The number and arrangement of components of the system 100 shown in FIG. 1 are provided as an example. There may be additional systems and/or devices, fewer systems and/or devices, different systems and/or devices, or differently arranged systems and/or devices than those shown in FIG. 1. One or more devices or components of the system 100 shown in FIG. 1 may perform one or more functions described as being performed by another device or component.

With continued reference to FIG. 1, the controller 140 may include a bus 142, a processor 144, a memory 146, a storage component 148, an input component 150, an output component 152, and a communication interface 154.

The bus 142 may include a component that permits communication among the components of system 100. In some non-limiting embodiments or aspects, the processor 144 may be implemented in hardware, software, or a combination of hardware and software. For example, the processor 144 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 146 may include random access memory (RAM), read-only memory (ROM), and/or another type of dynamic or static storage device (e.g., flash memory, magnetic memory, optical memory, etc.) that stores information and/or instructions for use by the processor 144.

The storage component 148 may store information and/or software related to the operation and use of one or more components of the system 100. For example, the storage component 148 may include a hard disk (e.g., a magnetic disk, an optical disk, a magneto- optic disk, a solid state disk, etc.), a compact disc (CD), a digital versatile disc (DVD), a floppy disk, a cartridge, a magnetic tape, and/or another type of computer-readable medium, along with a corresponding drive.

The input component 150 may include a component that permits one or more components of the system 100 to receive information, such as via user input (e.g., a touch-screen display, a keyboard, a keypad, a mouse, a button, a switch, a microphone, a camera, etc.). The output component 152 may include a component that provides output information from one or more components of the system 100 (e.g., a display, a speaker, one or more light-emitting diodes (LEDs), etc.).

The communication interface 154 may include a transceiver-like component (e.g., a transceiver, a separate receiver and transmitter, etc.) that enables one or more components of the system 100 to communicate with other devices, such as via a wired connection, a wireless connection, or a combination of wired and wireless connections. The communication interface 154 may permit one or more components of the system 100 to receive information from another device and/or provide information to another device. For example, the communication interface 154 may include an Ethernet interface, an optical interface, a coaxial interface, an infrared interface, a radio frequency (RF) interface, a universal serial bus (USB) interface, a WiFi® interface, a cellular network interface, and/or the like.

The controller 140 may perform one or more processes described herein. The controller 140 may perform these processes based on the processor 144 executing software instructions stored by a computer-readable medium, such as the memory 146 and/or the storage component 148. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into the memory 146 and/or the storage component 148 from another computer-readable medium or from another device via communication interface 154. When executed, software instructions stored in the memory 146 and/or the storage component 148 may cause the processor 144 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

The memory 146 and/or the storage component 148 may include data storage or one or more data structures (e.g., a database, and/or the like). The controller 140 may be capable of receiving information from, storing information in, communicating information to, or searching information stored in the data storage or one or more data structures in the memory 146 and/or the storage component 148. For example, the information may include data associated with a set of profiles, input data, output data, transaction data, account data, or any combination thereof.

Figure 3A:
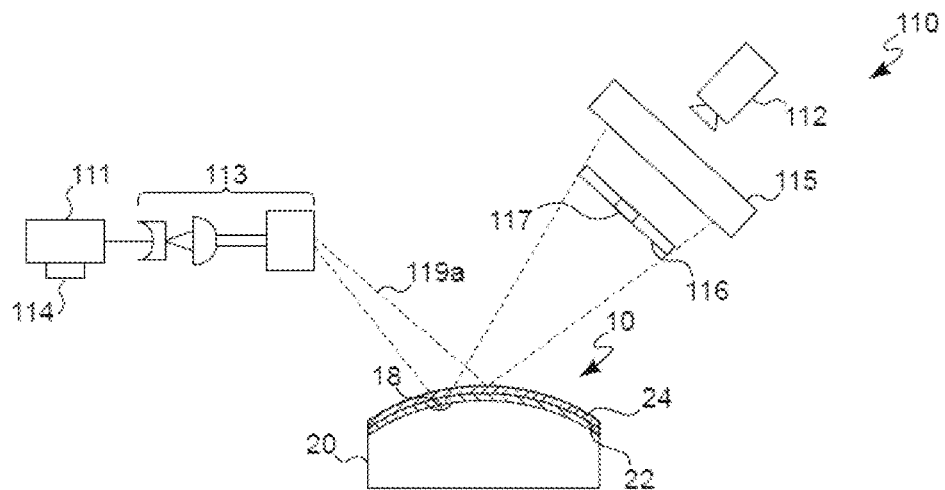
FIGS. 3A-3B are schematic views of a mark identification device of the system shown in FIG. 2.

With reference to FIG. 3A, the mark identification device 110 is shown in accordance with some embodiments or aspects of the present disclosure. Generally the mark identification device 110 includes at least one electromagnetic radiation source 111 and at least one imaging device 112. In some embodiments or aspects, the at least one electromagnetic radiation source 111 may be configured to irradiate at least a portion of the surface of the substrate 20 having the at least one first mark 18 with a first beam of electromagnetic radiation 119a. The at least one imaging device 112 may be configured to receive at least a portion of the first beam of electromagnetic radiation 119a reflected from the surface of the substrate 20 having the at least one first mark 18 and determine a position of the at least one first mark 18 on the surface of the substrate 20.

With continued reference to FIG. 3A, the at least one electromagnetic radiation source 111 may be a laser. The laser may be a continuous wave laser or a pulsed wave laser. In some embodiments or aspects, the laser may be a visible light laser having a wavelength in a range of 380 nm to 780 nm. In other embodiments or aspects, the laser may be an ultraviolet light laser having a wavelength in the range of 100 nm to less than 380 nm. In further embodiments or aspects, the laser may be an infrared light laser having a wavelength in the range of more than 780 nm and up to 30,000 nm. In further embodiments or aspects, the at least one electromagnetic radiation source 111 may be a visible light source that is coherent and monochromatic (or nearly monochromatic). In various embodiments or aspects, the visible light source may be a high-intensity xenon arc lamp, a light-emitting diode (LED), fluorescent lamp, or any other visible light source. Monochromatic characteristic of the at least one electromagnetic radiation source 111 may be a function of the type of electromagnetic source 111, such as, for example, if the electromagnetic radiation source 111 is an LED, or it can be generated using at least one of a filter and a monochrometer.

The at least one electromagnetic radiation source 111 is configured to project the first beam of electromagnetic radiation 119a, such as laser light, onto at least a portion of the exterior 26 of the substrate 20 having the first mark 18 thereon. In some embodiments or aspects, the at least one electromagnetic radiation source 111 may be configured to project a converging, a diverging, or a collimated first beam of electromagnetic radiation 119a onto at least a portion of the exterior 26 of the substrate 20 having the first mark 18 thereon.

At least one beam manipulation device 113 may be provided for manipulating the characteristics of the first beam of electromagnetic radiation 119a from the at least one electromagnetic radiation source 111, such as the shape of the beam and/or a position at which the beam is projected on the surface of the substrate 20. In some embodiments or aspects, the at least one beam manipulation device 113 may be configured to manipulate the size of the beam of electromagnetic radiation emitted from the at least one electromagnetic radiation source 111. For example, the at least one beam manipulation device 113 may be configured to control the size of the beam of electromagnetic radiation between 0.2 mm and 80 mm. In some embodiments or aspects, the at least one beam manipulation device 113 may be configured to converge, diverge, or collimate the beam emitted from the at least one electromagnetic radiation source 111. For example, the at least one beam manipulation device 113 may have at least one beam expander, at least one converging lens, at least one diverging lens, at least one collimating lens, or any combination thereof. In some embodiments or aspects, the at least one beam manipulation device 113 may be a plano-concave beam expander that is configured to control the position at which the beam from the at least one electromagnetic radiation source 111 is projected on the surface of the substrate 20. For example, the at least one beam manipulation device 113 may be a galvanometer, a servo, a gimbal, and/or any combination thereof In some embodiments or aspects, the at least one beam manipulation device 113 may be a spatial filter configured to improve the coherency of the electromagnetic radiation emitted from the at least one electromagnetic radiation source 111. In various embodiments or aspects, the at least one beam manipulation device 113 may include a plurality of individual beam manipulation devices 113.

In further embodiments or aspects, a position of the at least one electromagnetic radiation source 111 relative to the substrate 20 may be controlled via at least one source manipulation device 114. For example, the at least one beam manipulation device 113 may be configured to move the at least one electromagnetic radiation source 111 in any direction in a Cartesian coordinate system relative to the substrate 20, and/or to change an angular orientation of the at least one electromagnetic radiation source 111 relative to the substrate 20.

With continued reference to FIG. 3A, the at least one imaging device 112 is configured to receive a portion of the first beam of electromagnetic radiation 119a reflected from the surface of the substrate 20 having the at least one first mark 18 and determine a position of the at least one first mark 18 on the surface of the substrate 20. In some embodiments or aspects, the at least one imaging device 112 may be a camera, such as an optical camera. The camera may be configured to capture image data of the first beam of electromagnetic radiation 119a that is reflected from the surface of the substrate 20 having the first mark 18 thereon and projected onto a viewing surface 115. For example, the camera may be configured to capture image data comprising the reflected image of the first mark 18. The camera may be chosen such that it is configured to capture image data based on the characteristics of the electromagnetic radiation emitted from the at least one electromagnetic radiation source 111. For example, the camera may be a visible light camera, an infrared camera, or a UV camera. Various lenses may be used to enhance the optical properties of the camera. The viewing surface 115 is configured for receiving the portion of the first beam of electromagnetic radiation 119a that is reflected from the surface of the substrate 20 such that the first beam 119a may be captured by the camera. In some embodiments or aspects, the viewing surface 115 may be a planar screen that is positioned between the at least one imaging device 112 and the optical article 10. The viewing surface 115 may be transparent or translucent. One or more masks 116, with each mask 116 having at least one opening 117, may be used to block at least a portion of the first beam of electromagnetic radiation 119a that is reflected onto the viewing surface 115. Each mask 117 may be positioned between the camera and the coated optical article 10.

With continued reference to FIG. 3A, the at least one imaging device 112 may be programmed or configured to capture image data of a portion of the reflected first beam of electromagnetic radiation 119a. For example, first beam of electromagnetic radiation 119a from the at least one electromagnetic radiation source 111 may be focused on a portion of the top surface of the optical article 10, such as via the at least one beam manipulation device 113 and/or the at least one source manipulation device 114. The controller 140 (shown in FIG. 2) may be configured or programmed to analyze the image data recorded by the at least one imaging device 112 and determine whether the image data comprises information indicating the presence of the reflected image of the first mark 18. If the reflected image of the first mark 18 is found, the position of the reflected mark 18 is stored. For example, the controller 140 may be configured or programmed to store the position of the reflected mark 18 in the memory 146 and/or the storage component 148 as coordinate data. In some examples or aspects, coordinate data may be a set of X-axis and Y-axis coordinates corresponding to a top view plane of the optical article 10.

If the reflected image of the first mark 18 is not found in the image data of the portion of the optical article 10 captured by the at least one imaging device 112, first beam of electromagnetic radiation 119a from the at least one electromagnetic radiation source 111 may be focused on a different portion of the top surface of the optical article 10 that has not been previously imaged, such as via the at least one beam manipulation device 113 and/or the at least one source manipulation device 114. The controller 140 may then analyze the image data associated with the different portion of the top surface 12 of the optical article 10 and determine whether the image data comprises information indicating the presence of the reflected image of the first mark 18. The process of capturing image data of a portion of the optical article 10 and analyzing whether the image data includes the reflected image of the first mark 18 may be repeated until the reflected image is found or the optical article 10 is deemed not to have the first mark 18.

In some embodiments or aspects, instead of capturing and analyzing image data of discrete portions of the optical article in an iterative manner, the at least one imaging device 112 may be configured to continuously capture image data of reflected first beam of electromagnetic radiation 119a as the first beam of electromagnetic radiation 119a is manipulated to scan or sweep across the entire top surface of the optical article 10. For example, the controller 140 may be configured or programmed to control the at least one beam manipulation device 113 and/or the at least one source manipulation device 114 in a manner such that electromagnetic radiation from the at least one electromagnetic radiation source 111 irradiates the entire surface of the optical article 10 by continuously scanning or sweeping across different portions of the optical article 10. In some embodiments or aspects, the at least one beam manipulation device 113 and/or the at least one source manipulation device 114 may be controlled in a manner such that first beam of electromagnetic radiation 119a from the at least one electromagnetic radiation source 111 is projected in a line that is swept across the surface of the optical article 10.

In further embodiments or aspects, the mask 116 may be placed between the at least one electromagnetic radiation source 111 and the viewing surface 115 such that the mask 116 blocks the first beam of electromagnetic radiation 119a except for portion of the first beam of electromagnetic radiation 119a that passes through the opening 117 of the mask 116.

Figure 3B:
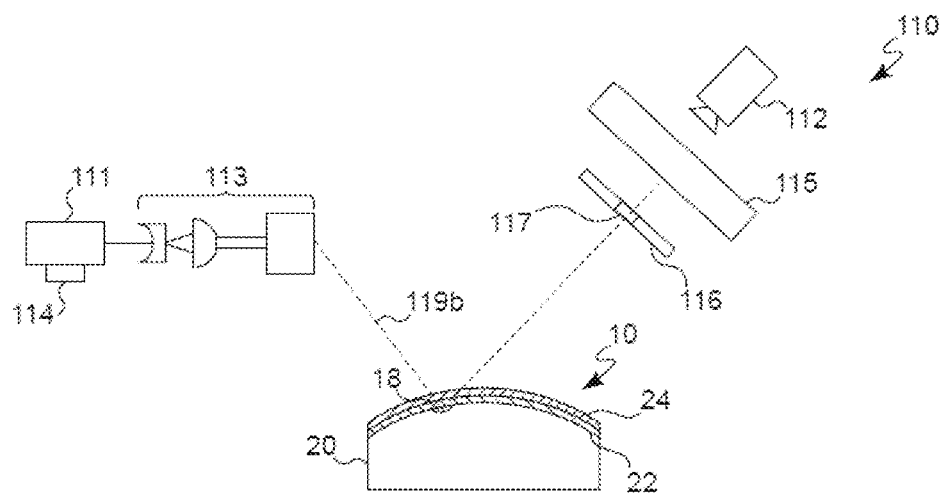

With reference to FIG. 3B, after determining that image data of the optical article 10 has a reflected image of the first mark 18, the system 100 may be configured to verify the position of the reflected image of mark 18 by directing a second beam of electromagnetic radiation 119b at a location on the top surface of the optical article 10 based on coordinate data determined during the initial analysis of the image data. The second beam of electromagnetic radiation 119b may be a focused beam having the same general size as the first mark 18, For example, the focused beam may be have diameter of up to 2.0 mm. For example, the controller 140 may be configured or programmed to control the at least one beam manipulation device 113 and/or the at least one source manipulation device 114 in a manner such that the second beam of electromagnetic radiation 119b from the at least one electromagnetic radiation source 111 is directed to the top surface 12 of the optical article 10 at the location that has the X-axis and Y-axis coordinates in the top view plane of the optical article 10 that correspond to the location of the reflected image of the first mark 18. New image data may be captured by the at least one imaging device 112.

Figure 4:
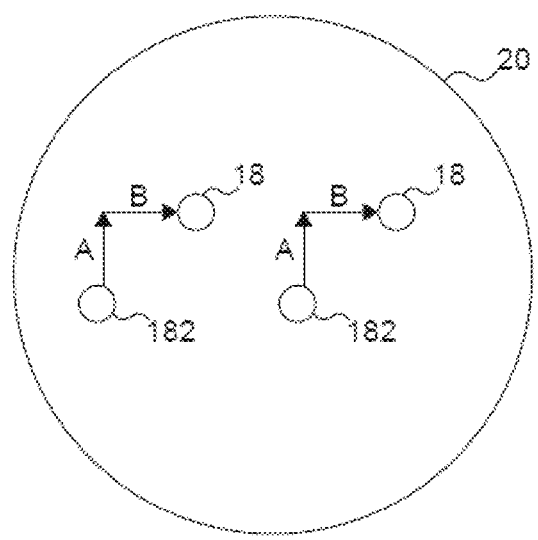
FIG. 4 is a top view of a first mark and identification indicia used by the mark identification device to identify the position of the first mark.

With reference to FIG. 4, image data captured by the at least one imaging device 112 may be used to verify the alignment of the second beam of electromagnetic radiation 119b relative to the reflected image of the first mark 18. For example, if the location of the second beam of electromagnetic radiation 119b does not align with the location of the reflected image of the first mark 18, the controller 140 may be configured or programmed to control the at least one beam manipulation device 113 and/or the at least one source manipulation device 114 in a manner to guide the second beam of electromagnetic radiation 119b in a direction of arrow A (corresponding to, for example, Y-axis direction in the top view plane of the optical article), and/or in a direction of arrow B (corresponding to, for example, X-axis direction in the top view plane of the optical article). Once the position of the second beam of electromagnetic radiation 119b is aligned with the position of the reflected image of the first mark 18, the coordinate data of this location may be used for guiding the at least one marking device 120 for marking the second mark 180 on the optical article 10, as described herein.

Figure 5:
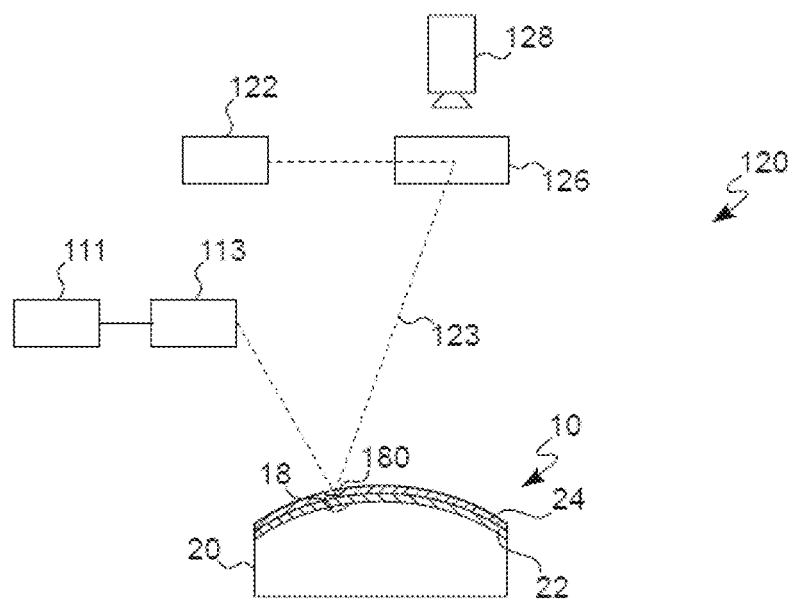
FIG. 5 is a schematic view of a marking device of the system shown in FIG. 2.

With reference to FIG. 5, the at least one marking device 120 is shown in accordance with some embodiments or aspects. As discussed herein, the at least one marking device 120 is configured to mark at least a portion of the coated article 10 with the at least one second mark 180. In some embodiments or aspects, the at least one marking device 120 may be configured to mark at least one coating layer, such as the first coating layer 22 and/or the at least one additional coating layer 24 at a location on the optical article 10 that corresponds to the location of the first mark 18. In further embodiments or aspects, the at least one marking device 120 may be configured to mark at least one coating layer and the substrate 20, such as at least one surface of the substrate 20.

With continued reference to FIG. 5, the at least one marking device 120 has an etching device 122 configured for projecting a beam of electromagnetic radiation 123 onto the surface of the optical article 10, such as the at least one coating layer of the optical article 10. The etching device 122 may be a laser. The laser may be a continuous wave laser or a pulsed wave laser. In some embodiments or aspects, the laser may be a visible light laser having a wavelength in a range of 380 nm to 780 nm. In other embodiments or aspects, the laser may be an ultraviolet light laser having a wavelength in the range of 100 nm to less than 380 nm. In further embodiments or aspects, the laser may be an infrared light laser having a wavelength in the range of more than 780 nm and up to 30,000 nm.

The beam of electromagnetic radiation 123 from the etching device 122 may be configured to etch the surface of at least one coating layer of the optical article 10, such as the first coating layer 22 and/or the at least one additional coating layer 24, with the second mark 180 at a location on the optical article 10 that corresponds to the location of the first mark 18. The second mark 180 may be etched at a depth of 2.75 µm to 5 µm.

In some embodiments or aspects, the etching device 122 may be configured for sub-surface etching of the second mark 180 below an outer surface of the at least one coating layer on the optical substrate 20. In further embodiments or aspects, the etching device 122 may be configured for sub-surface etching of the second mark 180 below the surface of the optical substrate 20. The beam of electromagnetic radiation 123 from the etching device 122 may be focused, such as using one or more focusing elements, to a desired depth below the outer surface of the at least one coating or below the outer surface of the substrate 20. The sub-surface depth of the second mark 180 may be further controlled by changing the distance between the etching device 122 and the optical article 10, such as moving one or both of the etching device 122 and the optical article 10. The etching device 122 may be angled relative to the coated optical article 10 in order to account for any surface curvature of the substrate 20 such that the beam of electromagnetic radiation from the etching device 122 is symmetrically diffracted. In some embodiments or aspects, the second mark 180 may be made by layering a plurality of sub-surface layers at different depths below the surface of the at least one coating layer or the surface of the optical substrate 20. In this manner, the second mark 180 may have a three-dimensional shape.

The at least one marking device 120 further has a mirror 126 configured for reflecting the beam of electromagnetic radiation 123 from the etching device 122 toward the surface of the optical article 10. In some embodiments or aspects, the mirror 126 may be a one-way mirror. At least one etching beam manipulation device 124 may be provided for controlling a position at which the beam of electromagnetic radiation 123 from the etching device 122 is projected on the optical article 10. For example, the at least one etching beam manipulation device 124 may be a galvanometer, a servo, a gimbal, and/or any combination thereof that controls an orientation of the at least one mirror 126. The controller 140 (shown in FIG. 2) may be configured or programmed to control the at least one etching beam manipulation device 124 in a manner such that the beam of electromagnetic radiation 123 from the etching device 122 is directed toward the top surface of the optical article 10 as a focused beam 123 at location that has the X-axis and Y-axis coordinates in the top view plane of the optical article 10 that correspond to the location of the reflected image of the first mark 18.

With continued reference to FIG. 5, the at least one marking device 120 may have a camera 128 positioned between the mirror 126 and the optical article 10. The camera 128 may be configured to capture image data of the optical article 10 through the mirror 126, such as a one-way mirror. In some embodiments or aspects, the camera 128 may be aligned such that it is positioned directly over the top surface of the optical article 10 at an angle that is substantially perpendicular to a plane of the top surface of the optical article 10. The camera may be a visible light camera, an infrared camera, or a UV camera. Various lenses and filters may be used to enhance the optical properties of the camera. The controller 140 (shown in FIG. 2) may be configured or programmed to analyze the image data recorded by the camera 128 and determine whether the image data comprises information indicating the presence of the focused beam 123 on the top surface of the optical article 10.

The controller 140 (shown in FIG. 2) may be further configured to guide the at least one etching beam manipulation device 124 to position the mirror 126 such that the focused beam of electromagnetic radiation 123 from the etching device 122 is directed to the same position as the second beam of electromagnetic radiation 119$b$ from the at least one electromagnetic radiation source 111 that indicates a position of the first mark 18 on the substrate 20 of the optical article 10. In this manner, the camera 128 may be used for guiding the position of the mirror 126 such that the focused beam of electromagnetic radiation 123 from the etching device 122 can be aligned with the second beam 119$b$ from the at least one electromagnetic radiation source 111. Such alignment of the focused beam 123 and the second beam 119$b$ assures that the position of the second mark 180 corresponds to the position of the first mark 18. The at least one marking device 120 may be calibrated with the at least one mark identification device 110 to account for any differences in angles at which the focused beam 123 and the second beam 119$b$ are projected onto the optical article 10.

With continued reference to FIG. 5, after the at least one marking device 120 is aligned to project the focused beam of electromagnetic radiation 123 onto the desired location on the optical article 10 that corresponds to the position of the first mark 18, the etching device 122 may be operated to etch at least one coating layer of the coated optical article 10 with the second mark 180.

Figure 6:
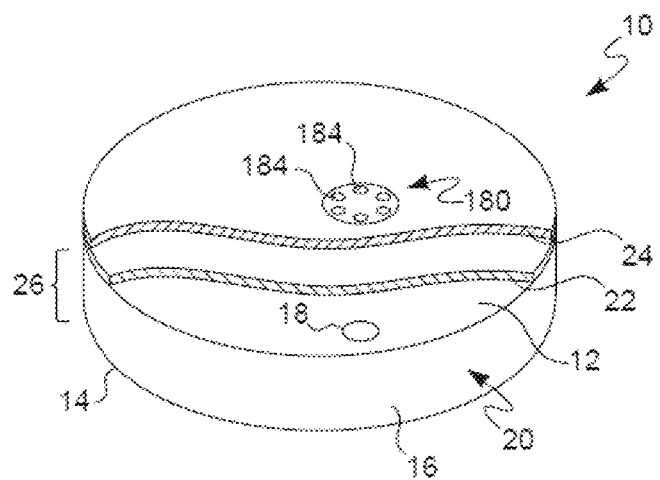
FIG. 6 is a representative partial cross-sectional perspective view of a coated optical article having a first mark and a second mark imparted by the marking device.

In some embodiments or aspects, the second mark 180 may be an array of elements 184 on at least one coating layer of the coated optical article 10, such as the first coating layer 22 and/or the additional coating layer 24 (see FIG. 6). In some embodiments or aspects, each element 184 may be a dot, a line, or any other geometric element. For example, element 184 may have a circular shape, an oval shape, a rectangular shape, a triangular shape, or any other geometric shape. The elements 184 in the array of elements 184 may be the same or different from each other. The elements 184 in the array of elements 184 may be connected to each other or separate from each other. For example, the elements 184 may have a spacing between 15-30 µm between each other. The array of elements 184 may define a pattern, such as a cross-hatch pattern, a honeycomb pattern, a circular pattern, or any other pattern. The at least one marking device 120 may be configured to adjust at least one of a size of each element 184 in the array of element 184, a depth of each element 184 in the array of elements 184, and a density of the array of elements 184.

In some embodiments or aspects, size and shape of the second mark 180 may be selected to correspond to the size and shape of the first mark 18.

In some embodiments or aspects, the second mark 180 may be shaped to define the same optical reference mark as the first mark 18 that a practitioner may use as a reference point in matching a power of the optical article 10 to a wearer's prescription. In other aspects, the second mark 180 may be an indicia, such as a logo. Various dimensions of the second mark 180, including the depth, height, and width, can be selected based on the desired characteristics of the second mark 180.

Figure 7:
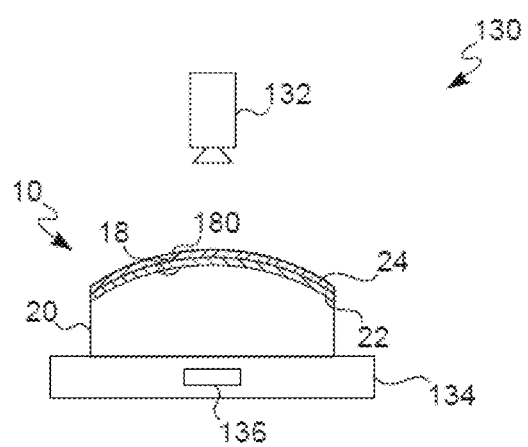
FIG. 7 is a schematic view of a verification device of the system shown in FIG. 2.

With reference to FIG. 7, the verification device 130 may be configured for comparing the position of the at least one second mark 180 relative to the position of the at least one first mark 18 and determining whether the position of the at least one second mark 180 is within a predetermined distance of the position of the at least one first mark 18. In some embodiments or aspects, the verification device 130 may include a verification camera 132 and a backlight source 136. The coated optical article 10 that is marked with the second mark 180 is positioned between the verification camera 132 and the backlight source 136. The second mark 180 may be visible when electromagnetic energy from the backlight source 136 is viewed through the coated optical article 10. Observance of the second mark 180 can be enhanced, as with some aspects, by the concurrent use of magnification of the second mark 180, such as one or more magnifying lenses (not shown) interposed between the second mark 180 and the observer.

In some embodiments or aspects, the verification camera 132 may be the same camera as the camera 128 used with the at least one marking device 120. The backlight source 136 may be provided on a platform 134 that supports the optical article 10 such that the optical article 10 may be illuminated from the bottom using the backlight source 136. In some embodiments or aspects, the backlight source 136 may be a light bulb configured to emit light in the visible spectrum. The backlight source 136 of visible light can, with some aspects, have one or more wavelengths from 380 nanometers to 710 nanometers, inclusive of the recited values. In other embodiments or aspects, the backlight source 136 may be an infrared light source or an ultraviolet light source. The verification camera 132 may be chosen such that it is configured to capture image data based on the characteristics of the electromagnetic radiation emitted from the backlight source 136. For example, the verification camera 132 may be a visible light camera, an infrared camera, or a UV camera. Various lenses and filters may be used to enhance the optical properties of the verification camera 132.

With continued reference to FIG. 7, the verification camera 132 may be programmed or configured to capture image data of the top surface of the marked optical article 10 including the second mark 180. The controller 140 (shown in FIG. 2) may be configured or programmed to analyze the image data recorded by the verification camera 132 and determine whether the image data comprises information indicating the presence of the second mark 180. If the second mark 180 is found, the position of the second mark 180 is compared to the stored position of the first mark 18. For example, the controller 140 may be configured or programmed to store the position of the second mark 180 in the memory 146 and/or the storage component 148 as coordinate data. In some examples or aspects, coordinate data may be a set of X-axis and Y-axis coordinates corresponding to a top view plane of the optical article 10.

The controller 140 may be further configured or programmed to compare the position of the second mark 180 with the stored position of the first mark 18. If the position of the second mark 180 is within a predetermined distance of the position of the first mark 18, the marked optical article 10 is deemed to be acceptable. If the position of the second mark 180 is outside a predetermined distance of the position of the first mark 18, the marked optical article 10 is deemed to be unacceptable. In some embodiments or aspects, the unacceptable optical article 10 may be marked with a new second mark 180 and the position of the new second mark 180 may be compared to the position of the first mark 18 to determine whether the new second mark 180 is acceptable.

Having described the structure of the coated optical article 10 and the system 100 for marking the coated optical article 10 with the second mark 180 based on a position of the first mark 18 on the substrate 20 of the optical article 10, a method 200 of marking the coated optical article 10 will now be described with reference to FIG. 8. In some embodiments or aspects, the method 200 includes, at step 201, determining a position of the first mark 18 on the substrate 20 of the optical article 10 using the at least one mark identification device 110. For example, as shown in FIG. 3A, the first mark 18 may be irradiated with a first beam of electromagnetic radiation 119a from the at least one electromagnetic radiation source 111 and a reflected image of the first mark 18 may be captured by the at least one imaging device 112. The controller 140 may analyze the image data of the top surface of the optical article 10 and determine whether the image data comprises information indicating the presence of the reflected image of the first mark 18. As shown in FIG. 3, the position of the reflected image of mark 18 may be verified by directing a second beam of electromagnetic radiation 119b at a location on the top surface of the optical article 10 based on coordinate data determined during the initial analysis of the image data.

Figure 8:
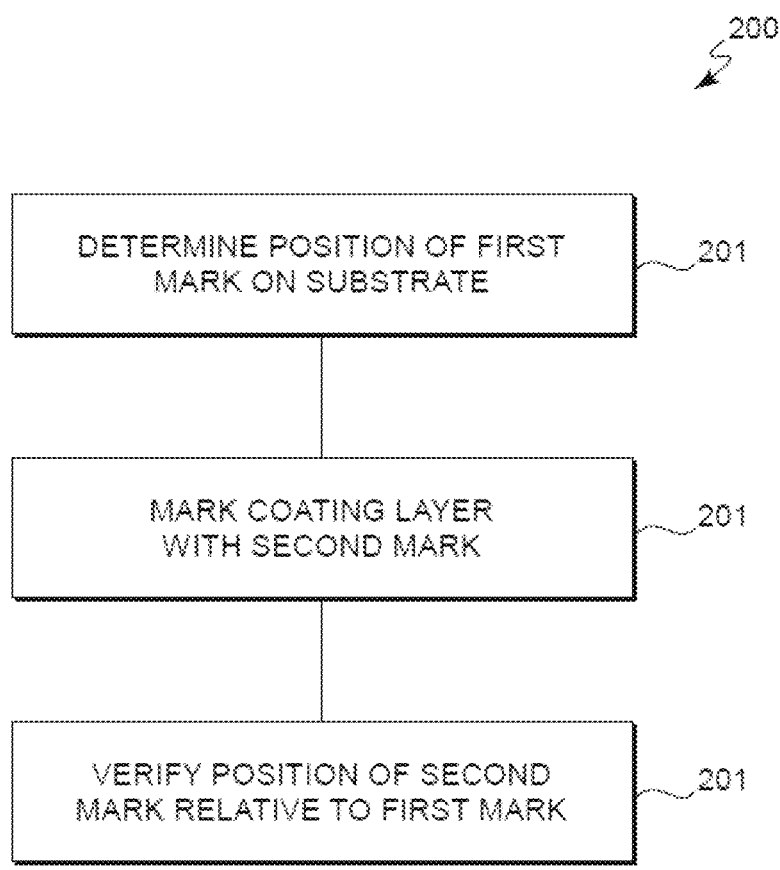
FIG. 8 is a flowchart of a method for marking a coated optical article with a second mark.

With continued reference to FIG. 8, at step 202, the coated optical article 10 is marked with the second mark 180 using the at least one marking device 120. As shown in FIG. 5, the at least one marking device 120 may be configured to mark at least one coating layer, such as the first coating layer 22 and/or the at least one additional coating layer 24 at a location on the optical article 10 that corresponds to the location of the first mark 18. The etching device 122 of the at least one marking device 120 is configured for projecting a beam of electromagnetic radiation 123 onto the surface of the optical article 10, such as the at least one coating layer of the optical article 10, at a position corresponding to the position of the first mark 18 in order to mark or etch the at least one coating layer of the coated optical article 10 with the second mark 180. The second mark 180 may be shaped to define the same optical reference mark as the first mark 18 that a practitioner may use as a reference point in matching a power of the optical article 10 to a wearer's prescription.

With continued reference to FIG. 8, at step 203, a position of the second mark 180 is determined using the verification device 130 and the position of the at least one second mark 180 is verified to be within a predetermined distance of the position of the at least one first mark 18. As shown in FIG. 7, the marked optical article 10 is positioned between the verification camera 132 and the backlight source 136 such that the second mark 180 can be visualized by the camera 132. The position of the second mark 180 is then compared with the stored position of the first mark 18 to determine if the second mark 180 is within a predetermined distance of the first mark 18, thereby deeming the marked optical article 10 to be acceptable.

The present disclosure has been described with reference to specific details of particular aspects thereof. It is not intended that such details be regarded as limitations upon the scope of the disclosure except insofar as and to the extent that they are included in the accompanying claims.

What is claimed is:

1. A system for marking a coated optical article having at least one first mark on a surface of a substrate of the coated optical article, the system comprising:
   at least one mark identification device comprising:
      at least one electromagnetic radiation source configured to irradiate at least a portion of the surface of the substrate having the at least one first mark with electromagnetic radiation; and
      at least one imaging device configured to receive a portion of the electromagnetic radiation reflected from the surface of the substrate having the at least one first mark and determine a position of the at least one first mark on the surface of the substrate; and
   at least one marking device configured for marking the coated optical article with at least one second mark based on the position of the at least one first mark.

2. The system according to claim 1, wherein the at least one electromagnetic radiation source is a laser having a wavelength in a range of 190 nm to 10,000 nm.

3. The system according to claim 1, wherein the at least one imaging device comprises a viewing surface configured for receiving the portion of the electromagnetic radiation reflected from the surface of the substrate and a camera configured for imaging the viewing surface.

4. The system according to claim 1, wherein the at least one mark identification device further comprises at least one source manipulation device configured for controlling a position of the at least one electromagnetic radiation source relative to the coated optical article.

5. The system according to claim 1, wherein the at least one marking device is configured to mark at least one coating layer of the coated optical article with the at least one second mark.

6. The system according to claim 1, wherein the at least one imaging device comprises a camera and a mask having at least one opening, the mask being positioned between the camera and the coated optical article.

7. The system according to claim 1, wherein the at least one mark identification device further comprises at least one beam manipulation device configured for controlling at least one characteristic of the electromagnetic radiation.

8. The system according to claim 7, wherein the at least one beam manipulation device comprises at least one of a beam expander, a collimating lens, a converging lens, a diverging lens, a spatial filter, a galvanometer, a servo, or a gimbal.

9. The system according to claim 1, wherein the at least one second mark is an array of elements on at least one coating layer of the coated optical article.

10. The system according to claim 9, wherein the at least one marking device is configured to adjust at least one of a size of each element in the array of elements, a depth of each element in the array of elements, or a density of the array of elements.

11. The system according to claim 1, wherein the at least one marking device comprises an etching device and at least one mirror configured for reflecting a beam from the etching device onto the coated optical article.

12. The system according to claim 11, wherein the etching device is a laser having a wavelength in a range of 190 nm to 30,000 nm.

13. The system according to claim 1, further comprising a verification device configured for comparing the position of the at least one second mark relative to the position of the at least one first mark and determining whether the position of the at least one second mark is within a predetermined distance of the position of the at least one first mark.

14. The system according to claim 13, wherein the verification device comprises a verification camera and a backlight source, and wherein the coated optical article is configured to be positioned between the verification camera and the backlight source.

15. The system according to claim 13, wherein the verification device is further configured for guiding the at least one marking device such that the position of the at least one second mark at least partially overlaps the position of the at least one first mark.

16. A method for marking a coated optical article having at least one first mark on a surface of a substrate of the coated optical article, the method comprising:

irradiating at least a portion of the surface of the substrate having the at least one first mark with electromagnetic radiation using at least one electromagnetic radiation source;

determining a position of the at least one first mark on the surface of the substrate by receiving with at least one mark identification device a portion of the electromagnetic radiation reflected from the surface of the substrate having the at least one first mark; and marking the coated optical article with at least one second mark having a position based on the position of the at least one first mark using at least one marking device.

17. The method according to claim 16, further comprising controlling at least one characteristic of the electromagnetic radiation using at least one beam manipulation device of the at least one mark identification device.

18. The method according to claim 16, further comprising controlling a position of the at least one electromagnetic radiation source relative to the coated optical article using at least one source manipulation device of the at least one mark identification device.

19. The method according to claim 16, wherein marking the coated optical article comprises etching the at least one second mark into at least one coating layer of the coated optical article using an etching device.

20. The method according to claim 16, further comprising comparing the position of the at least one second mark relative to the position of the at least one first mark using a verification device and determining whether the position of the at least one second mark is within a predetermined distance of the position of the at least one first mark.

* * * * *